June 17, 1930.  L. MARX  1,764,330
WALKING MANIKIN
Filed Jan. 6, 1928
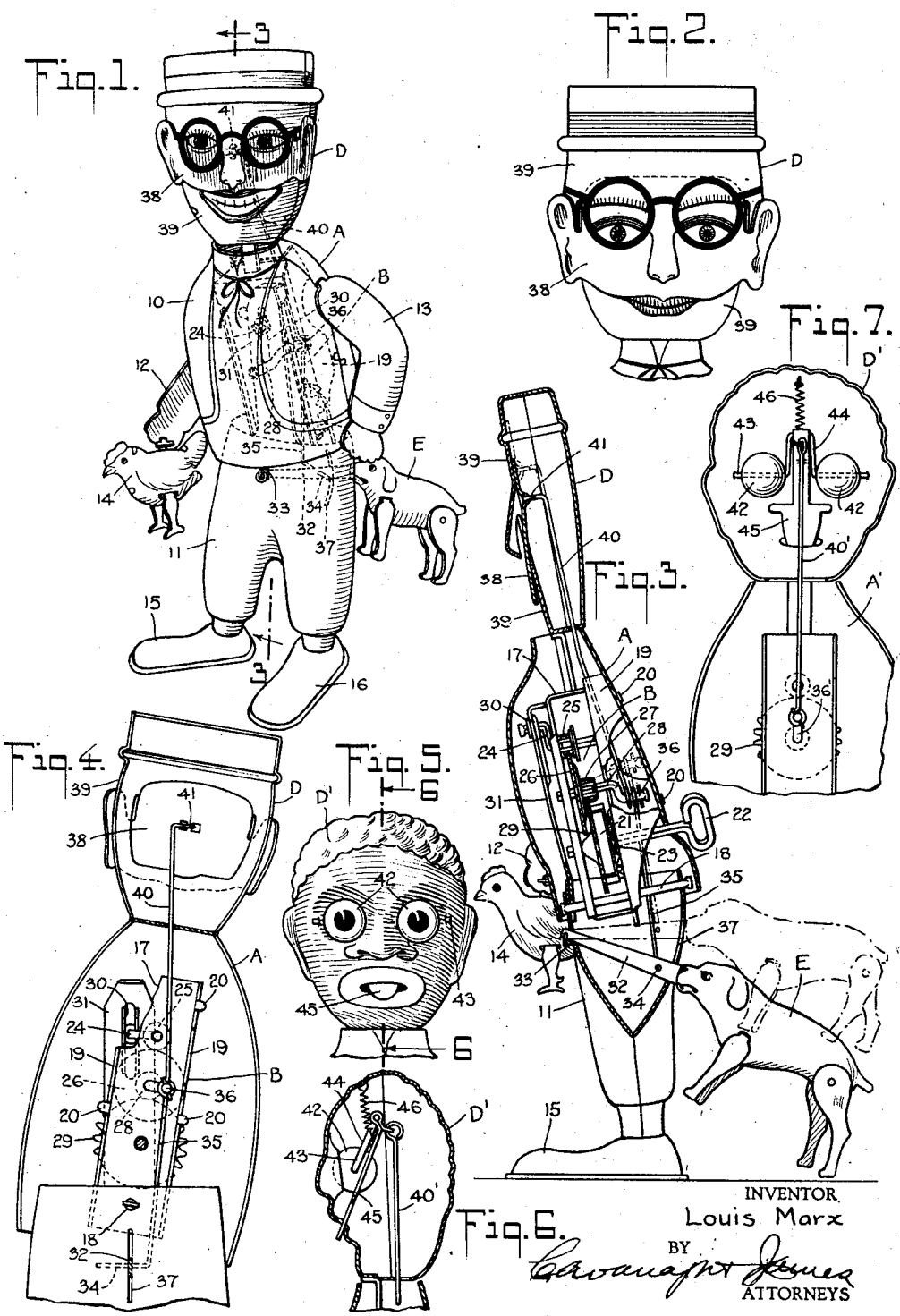
INVENTOR
Louis Marx
BY
ATTORNEYS Patented June 17, 1930

1,764,330

UNITED STATES PATENT OFFICE

LOUIS MARX, OF NEW YORK, N. Y.

WALKING MANIKIN

Application filed January 6, 1928. Serial No. 244,810.

This invention relates to a figure toy, and relates more particularly to a walking figure toy or manikin.

The prime desideratum of my present invention centers about the provision of improvements in figures or manikins of the type embodying motor mechanism operative for setting the figure into a simulating walking or running action, the improvements residing in the provision of means for imparting further or supplementary movements to the walking figure to enhance and render more lifelike the simulating actions thereof.

To the accomplishment of this desideratum one of the principal objects of the invention comprehends the provision of a walking figure preferably in the form of a manikin provided with a head embodying means for changing the expression thereof, such means being operated during a walking movement of the figure for the purpose of effecting a change of expression of the head during the walking action of the figure.

A further principal object of the invention resides in the provision of a walking manikin or figure, which is preferably designed to simulate a person in flight, combined with a second figure simulating preferably an animal in pursuit thereof, the combination embodying a mechanism for imparting to the simulated animal figure during the walking or fleeing movements of the manikin figure a movement characteristic of an animal in pursuit.

In the particular and preferred embodiment of the invention disclosed herein, the walking figure is designed to characterize a person fleeing with an article of theft and the pursuing animal is designed to represent a dog "hanging onto" the fleeing figure; and a further principal object of the invention in this preferred embodiment thereof relates to the provision of an ensemble in which the walking or fleeing movements of the figure and the change in the facial expressions thereof are harmonized and coordinated with the pursuing movements of the animal or dog and of the subject depicted.

To the accomplishment of the foregoing and such other objects as will hereinafter appear, my invention consists in the elements and their relation one to the other, as hereinafter more particularly described and sought to be defined in the claims, reference being had to the accompanying drawings which show the preferred embodiments of my invention, and in which Fig. 1 is a perspective view of one form of the walking figure or manikin embodying my invention showing the operated parts in one position thereof, Fig. 2 is a view of the head section of said figure taken on an enlarged scale and showing an expression of the head different than that shown in Fig. 1, Fig. 3 is a vertical elevational view thereof taken in cross section in the plane of the line 3—3, Fig. 1, Fig. 4 is a rear elevational view thereof with parts shown in section and other parts shown broken away, Fig. 5 is a front elevational view of a modified form of head which may be used in combination with the walking figure of the invention, Fig. 6 is a view taken in cross section in the plane of the line 6—6, Fig. 5, and Fig. 7 is a rear view of a modification, with parts broken away, showing the manner of connecting the head with the motor mechanism.

Referring now more in detail to the drawings and having reference first to Figs. 1 to 4 thereof, the walking figure or manikin of the invention is shown to comprise in the particular combination exemplified herein a figure A representing a manikin embodying a motor mechanism B for imparting a walking movement to the figure, the said figure being provided with a head D having means for changing the expression such as the facial expression thereof connected to and operated by the motor mechanism B, the ensemble further including a figure E representing an animal also connected for movement to the motor mechanism B. As shown in Fig. 1 of the drawings, the subject depicted, by way of a preferred example, is that of the theft of an object such as a fowl; and in simulation of the action portrayed, the motor mechanism B, in addition to setting the figure A into a simulating walking action, operates the pursuing animal E in a manner characteristic of the natural behaviour of a pursuing dog, and further operates the head D to produce a change in facial expression preferably characteristic of dismay and pain incident to the behaviour of the pursuing animal.

The walking figure A is of the type comprising the relatively movable upper and lower sections 10 and 11 each made out of sheet material suitably fashioned to provide hollow sections, the section 10 including the loosely mounted arms 12 and 13, the arm 12 loosely carrying a simulated chicken or other fowl 14, and the section 11 being provided with preferably weighted feet portions 15 and 16 also made preferably of sheet material. The upper body section 10 concealingly contains the motor mechanism B and is affixed thereto in a manner to be described presently so that the upper body section 10 is free to partake of the movements imparted by the motor mechanism B.

The motor mechanism B includes a frame 17 which is oscillatably mounted in a longitudinal median plane of the figure on a spindle or rod 18 which is journaled anteriorly and posteriorly on the lower body section 11, the said frame including two rearwardly extending flange portions 19, 19 provided with bendable fins 20, 20 (see Figs. 3 and 4 of the drawings) which are received in suitable apertures in the rear of the body section 10 and which are bent over the wall thereof, these being provided for affixing the upper body section 10 to the motor mechanism frame.

The motor mechanism proper supported in said frame 17 comprises a spring motor 21 provided with a winding key 22 and a ratchet means 23 for preventing reverse rotation thereof, the said spring motor being connected to a crank arm 24 by means of motion increasing gearing which includes a pinion 25 fixed to the shaft of the crank 24, a gear 26 and pinion 27 fixed to a crank shaft 28, the said pinion 27 meshing with a gear 29 fixed to one end of the spring motor 21. The operating arm of the crank 24 is arranged to ride in a slot 30 provided in an upstanding plate 31 which is fixedly attached at its bottom to a frontal portion of the bottom of the lower body section 11.

With this recited construction of the motor mechanism B and its attachment to the body sections of the figure A it will be seen that when the motor 21 is energized and the figure is set on a support, motion will be imparted to the free crank arm of the crank 24 causing the same to move constrainingly in the slot 30 of the plate 31, this resulting in imparting a side to side oscillating movement to the body section 10 about the axis of the spindle or rod 18, the mounting of the motor mechanism, the inclination of the parts of the figure such as shown in Fig. 3 of the drawings, and the weight of the parts being such that this oscillating movement of the upper body section throws the weight of the figure from side to side causing the same to oscillate to an extent sufficient to impart a walking movement to the figure as a whole.

In accordance with one of the objects of my present invention, the pursuing animal E is caused to move in simulation of the natural or lifelike behaviour of a pursuing dog; and to accomplish this the simulated animal figure E which may be made in any approved manner of sheet material or the like, is fixedly attached to a lever 32 having its fulcrum in an aperture 33 provided in the front of the body section 11, the said lever being pivotally connected at 34 to a rod 35, the upper end of which is connected to the crank arm extension 36 of the shaft 28. The lower rear portion or seat of the body section 11 is provided with an elongated and narrow guide slot 37. With this recited construction it will be seen that upon operation of the motor mechanism B and simultaneously with the walking movement imparted to the figure A, the lever 32 will be oscillated to cause the animal figure E to ascend and descend between the positions shown in full and dotted lines in Fig. 3 of the drawings, thus imparting the characteristic and desired movement to the animal figure E in simulation of its pursuing activity.

As aforestated, the head D of the manikin is operated to change the facial expression thereof, and in consonance with the subject portrayed, the head D being so mechanically designed that a movement imparted to the parts thereof will register dismay or distress. In Figs. 1 to 4 of the drawings, this is accomplished by the provision of a plate 38 having thereon a representation of the eyes and cheek as well as ears, the said plate being movable relatively to the remaining portion 39 of the head, the said remaining portion containing a representation of the chin, the nose, the spectacles and hat as clearly shown in Figs. 1 to 4 of the drawings. The face plate 38 is arranged as shown in Figs. 3 and 4 of the drawings so that the upper part moves interiorly of and the lower part moves exteriorly of the head section 39. The said plate section 38 comprises the movable member, and the same is moved between the full and dotted line position shown in Fig. 3 of the drawings by means of a rod 40 loosely affixed at its upper end as at 41 to the face plate 38 and connected at its lower end to the crank arm extension 36 of the shaft 28. With this construction it will be seen that operation of the motor mechanism B will cause the face plate 38 to move between the positions mechanically represented in Fig. 3 of the drawings for producing a change of expression from that shown in Fig. 1 of the drawings to that shown in Fig. 2 of the drawings, the movement of the face plate causing the eyes to move relatively to the rim of the spectacles and relatively to the eyebrows of the figure, and also causing the lips to vary in expression from an open position to a closed position. This change in expression is between the extreme of joy and utter dismay, and such change in facial expression produces a resulting effect of distress and pain which appears naturally incident to the behaviour of the pursuing animal E.

In Figs. 5 to 7 of the drawings I show a modification embodying a different type of head wherein a similar expression of distress and dismay is produced. In the form shown in these Figs. 5 to 7, the head D' is provided with a set of oscillatable or rolling eyes 42 movable in the usual eye-sockets provided in heads of this character, the said eye set 42 including a pivotal support 43 for the eye set journaled in the wall of the head D', as clearly shown in Figs. 5 and 7 of the drawings, the said support 43 being provided with an upturned U-shaped section 44 forming, in effect, an arm to which is connected the operating rod 40', which latter is affixed to a crank arm 36' similar to the crank arm 36 heretofore described in connection with Figs. 1 to 4 of the drawings. Preferably also a tongue-shaped element 45 simulating a tongue and protruding from the simulated mouth of the head of the manikin is pivotally connected to the U arm 44 so as to partake of the movements thereof, the tongue being thus operated in consonance with the rolling movements of the eyes 42. To assist in the return action of the parts there may be provided a spring 46 anchored to the head D' and to the arm 44 in the manner clearly depicted in the drawings. With this construction, operation of the motor B for imparting a walking action to the manikin causes the expressive rolling of the eyes of the head, creating a distinct impression of pain and distress.

The use and operation of the improved walking figure of my present invention will, in the main, be fully apparent from the above detailed description thereof. It will be further apparent that while I have shown and described my invention in the preferred forms, many changes and modifications may be made in the structure disclosed without departing from the spirit of the invention, defined in the following claims.

I claim:

1. In combination, a manikin figure having relatively movable body sections, motor mechanism carried by the figure operative for relatively moving said body sections so as to impart a walking movement to the manikin in simulation of a figure in flight, a second figure simulating an animal in pursuit movably attached to said manikin figure, and means connecting the animal figure with said motor mechanism operative for imparting movement to said animal figure during the walking movement of the manikin.

2. In combination, a manikin figure having relatively movable body sections, motor mechanism carried by the figure operative for relatively moving said body sections so as to impart a side to side oscillating walking movement to the manikin in simulation of a figure in flight, a second figure simulating an animal in pursuit movably suspended from said manikin figure at a lower rear portion thereof, and means connecting the animal figure with said motor mechanism operative for imparting an up and down oscillating movement to said animal figure during the walking movement of the manikin.

3. In combination, a manikin figure, motor mechanism carried by the figure operative for imparting a walking movement to the manikin in simulation of a figure in flight, a second figure simulating an animal in pursuit movably carried by said manikin figure, and means connecting the animal figure with said motor mechanism operative for imparting to the said animal figure a movement in simulation of pursuit during the walking movement of the manikin.

4. In combination, a manikin figure, motor mechanism carried by the figure operative for imparting a walking movement to the manikin, a second figure movably carried by said manikin finger, and means connecting the second figure with said motor mechanism operative for imparting thereto a cooperative movement during the walking movement of the manikin.

5. In combination, a manikin figure having relatively movable upper and lower body sections, motor mechanism carried by the figure operative for relatively moving said body sections so as to impart a walking movement to the manikin in simulation of a figure in flight, a second figure simulating an animal in pursuit movably attached to said manikin figure at the lower rear portion of its lower body section, and crank and rod means connecting the animal figure with said motor mechanism operative for imparting an ascending and descending movement to said animal figure during the walking movement of the manikin.

6. In combination, a manikin figure having body sections and a head, the said head having means movable for changing the facial expression thereof, motor mechanism carried by the figure operative for imparting a walking movement to the manikin in simulation of a figure in flight, a second figure simulating an animal in pursuit movably carried by said manikin figure, means connecting the animal figure with said motor mechanism operative for imparting to the said animal figure a movement in simulation of pursuit during the walking movement of the manikin, and means connecting the movable means of the head with said motor mechanism for changing the facial expression of the head during the said movements of the manikin and animal figures.

7. In combination, a manikin figure having body sections and a head, motor mechanism carried by the figure operative for imparting a walking movement to the manikin in simulation of a figure in flight, a second figure simulating an animal in pursuit carried by said manikin figure at a rear portion thereof, the said head having means movable for changing the expression thereof, and means connecting the movable means of the head with said motor mechanism for changing the expression of the head during the walking movement of the manikin.

8. In combination, a manikin figure having relatively movable body sections and a head, motor mechanism carried by the figure operative for relatively moving said sections and imparting a walking movement to the manikin in simulation of a figure in flight, the said head having means movable for changing the expression thereof, means connecting the movable means of the head with said motor mechanism for changing the expression of the head during the walking movement of the manikin, a second figure simulating an animal in pursuit movably carried by said manikin figure, and means connecting the animal figure with said motor mechanism operative for imparting to the said animal figure a movement in simulation of pursuit during the walking movement of the manikin.

Signed at New York city, in the county of New York and State of New York this 5th day of January, A. D. 1928.

LOUIS MARX.